US005551867A

United States Patent [19]

Shamp

[11] Patent Number: 5,551,867

[45] Date of Patent: Sep. 3, 1996

[54] METHOD OF CONVERTING A FURNACE TO OXYGEN-FUEL WHILE IT IS OPERATING AND ABURNER BLOCK ASSEMBLY

[75] Inventor: Donald E. Shamp, Millbury, Ohio

[73] Assignee: Schuller International, Inc., Denver, Colo.

[21] Appl. No.: 319,917

[22] Filed: Oct. 7, 1994

[51] Int. Cl.[6] ....... F23D 11/36

[52] U.S. Cl. ....... 431/154; 431/159; 431/187

[58] Field of Search ....... 431/159, 154, 431/353, 187

[56] References Cited

U.S. PATENT DOCUMENTS 4,536,152 8/1985 Little et al. ....... 431/159

5,199,866 4/1993 Joshi et al. ....... 431/353

*Primary Examiner*—Carroll B. Dority

*Attorney, Agent, or Firm*—Cornelius P. Quinn

[57] ABSTRACT

A method has been developed for converting a hot, operating furnace to oxy-fuel avoiding the problems of the past. This method comprises removing an old burner from the furnace, drilling a cylindrical hole, with its axis generally aligning with the axis of the opening in the old burner block, through the old burner block, removing the cut out portion, inserting a refractory tube in the new hole, and fastening an oxy-fuel burner onto the furnace to join in a sealing and or biased relationship with the outside end of said tube.

9 Claims, 3 Drawing Sheets

METHOD OF CONVERTING A FURNACE TO OXYGEN-FUEL WHILE IT IS OPERATING AND ABURNER BLOCK ASSEMBLY

BACKGROUND

During the last few years it has become desirable to convert air-gas or air-oil fueled furnaces, such as glass making furnaces or melters, to use oxygen instead of air or preheated air. Since the air-gas or air-oil burners use a refractory burner block having an internal flame containing or directing configuration that is undesirable for the preferred oxy-fuel burners, it has been necessary in the past to tear out the old burner blocks and replace them with new burner blocks having the desired internal configuration.

It is desirable to make such a conversion hot and while the melter continues to operate because to turn off and cool down the melter is extremely expensive. Removing the old burner blocks and installing the new blocks while the furnace is hot is difficult, time consuming, and disruptive to the process causing a costly effect on the process. Also, tearing out the old burner block often damages the surrounding wall reducing the life of the melter or requiring hot repairs. Where the furnace is old and the surrounding wall is in less than good condition it is often too risky and the furnace must either await a rebuild for conversion or the furnace must be rebuilt before the life of the refractories is expended, both of which are costly.

SUMMARY OF THE INVENTION

A method has been developed for converting a hot, operating furnace to oxy-fuel avoiding the problems of the past. This method comprises removing an old burner from the furnace, drilling a cylindrical hole, with its axis generally aligning with the axis of the opening in the old burner block, through the old burner block, removing the cut out portion, inserting a refractory tube in the new hole, and fastening an oxy-fuel burner onto the furnace to join in a sealing and or biased relationship with the outside end of said tube. This method can also be used to convert a hot banked or cold furnace without damaging the walls of the furnace. Preferably the cylindrical hole is made by core drilling such that the outside diameter of the drill is less than the diameter of a tunnel in the old burner block at the hot end of the old burner block so that the cutting end of the core drill does not reach the hot end of the old burner block. This minimizes or avoids getting refractory particles into the furnace and the work product in the furnace. Preferably a gasket made from refractory fiber is used to form a seal between the oxy-fuel burner and the cold end of the refractory tube.

To make the conversion faster and less work at the job site, it is possible to preassemble the new refractory tube, gasket seal, and the oxy-fuel burner into a single unit to be installed in the bored out old burner block.

DETAILED DESCRIPTION

Figure 1:
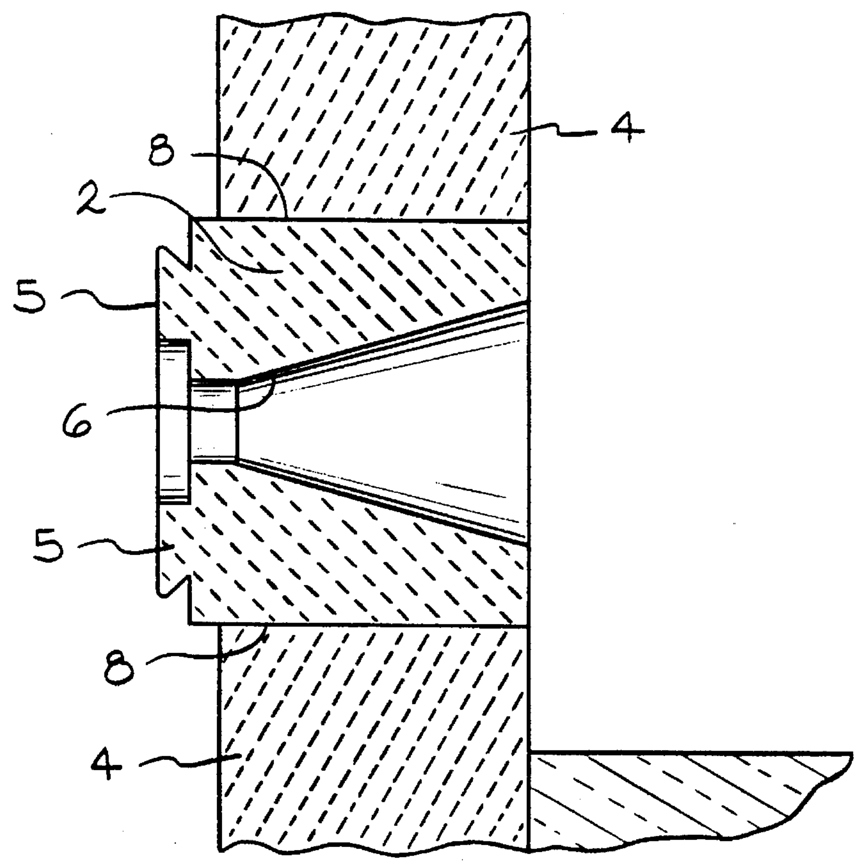
FIG. 1 is a partial cross section of a melter sidewall, showing an old air-fuel or oil-fuel burner block after an air-fuel burner is removed.

An air-fuel burner, whether the air is preheated or not, requires a burner block that has a bell or cone shaped internal opening or tunnel to contain the flame, with the small diameter of the tunnel joining with the burner and the largest diameter of the tunnel lying adjacent with the interior of the furnace or melter. FIG. 1 shows a typical air-fuel burner block 2 mounted in a sidewall 4 of a furnace, such as a glass melter. The notched ears 5 on the exterior face of the burner block 2 are for holding a metal plate which the air-fuel burner mounts on. The burner block 2 has an internal opening 6 that is generally cone shaped in this figure, but which can also be bell shaped and versions thereof.

The burner block 2 is normally mortared at the joints 8 with the wall 4 to prevent its movement in the wall. This, and a ceramic joint in the hottest portion near the interior caused by condensed volatiles and subsequent reaction with the refractories, prevents the block from being forced out of the wall of the furnace. To remove the burner block from a used furnace requires chipping the block out from the wall, which invariably causes pieces of refractory to enter the furnace causing problems, bad glass when the furnace is a glass melter. Other problems, as mentioned above, make removing the old burner blocks 2, which often number ten or more, very difficult and risky, particularly while trying to continue to operate the furnace while the conversion is taking place.

Figure 2:
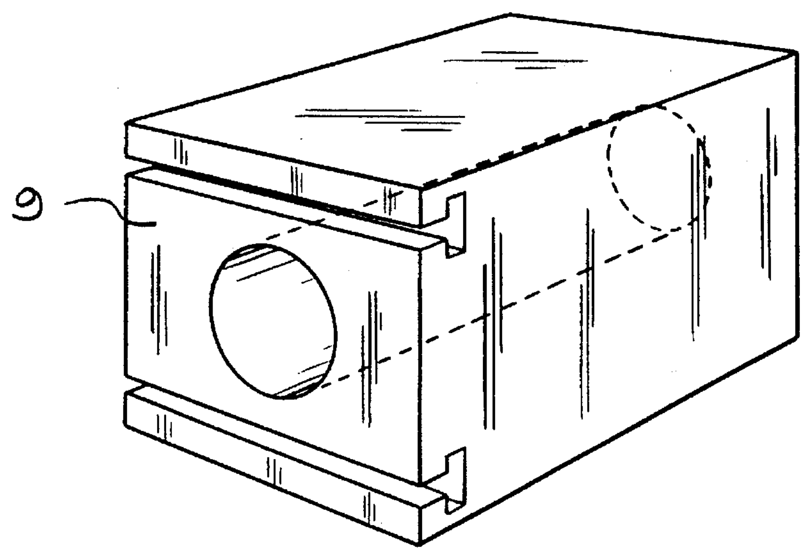
FIG. 2 is a prior art new burner block for an oxy-fuel burner.

Preferred oxy-fuel burners, such as the CLEANFIRE™ oxy-fuel burner supplied by Combustion TEC, Inc. of Orlando, Fla., because of the lower volume of gases these burners emit, need a burner block having a cylindrical opening or tunnel, like the block shown in FIG. 2, and are not operable effectively using the air-fuel shaped burner blocks tunnels. This type of burner and burner block are disclosed in U.S. Pat. No. 5,199,866, which disclosure is hereby incorporated here by reference. The present method overcomes the problems of the prior art method of tearing out the old burner blocks 2 to install new burner blocks 9 having the desired cylindrical tunnel.

Using the new method it is not necessary to shut down the furnace and there is little or no risk of significantly damaging the walls of the furnace. According to the new method an air-fuel burner is shut off of an operating furnace and removed from its mount on the sidewall and from the burner block. A piece of refractory fiber blanket cut to fit tightly into the hot end portion of the tunnel in the burner block is compressed and inserted into the open tunnel to the hot end where it expands to block the flow of furnace gases from coming through the tunnel.

Figure 3:
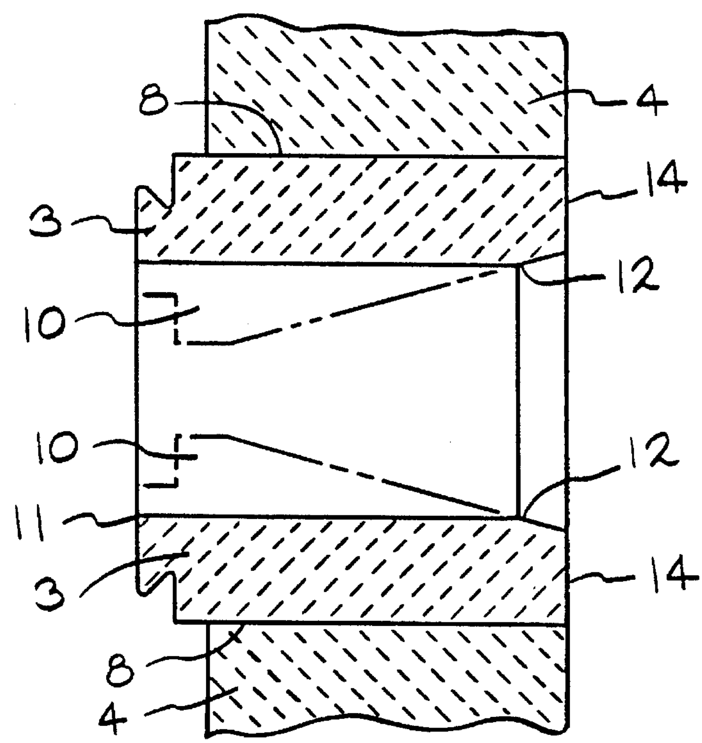
FIG. 3 is a partial cross section of a melter sidewall showing the burner block shown in FIG. 1 bored out according to the present invention.

Next, a core drill having a diameter slightly larger than the new refractory tube is positioned so that its axis is aligned with the axis of the tunnel of the old burner block and a core 10 of the old burner block is cut out so that it can be removed, as shown in FIG. 3. Preferably, a typical water cooled core drill is used and the water fed to the cutting edge of the tool removes refractory dust generated by the cutting tool out the bottom of the cut or tunnel 11. Also preferably, the diameter of the core drill will be somewhat less than the diameter of the large end of the tunnel so that the cutting will be completed at a point 12 before the inside face 14 of the block is reached to prevent dust and fine particles of refractory generated in the final portion of the cut from dropping into the furnace. The center core 10 of the old burner block 2 is removed leaving the outer part of the old block 3, the joints 8 and the wall 4 in place and undisturbed. The enlarged tunnel 11 left by removing the inner core 10 can be quickly plugged by inserting a piece of refractory insulator previously cut by the same core drill or a plug of refractory fiber to prevent escape of furnace gases.

Figure 4:
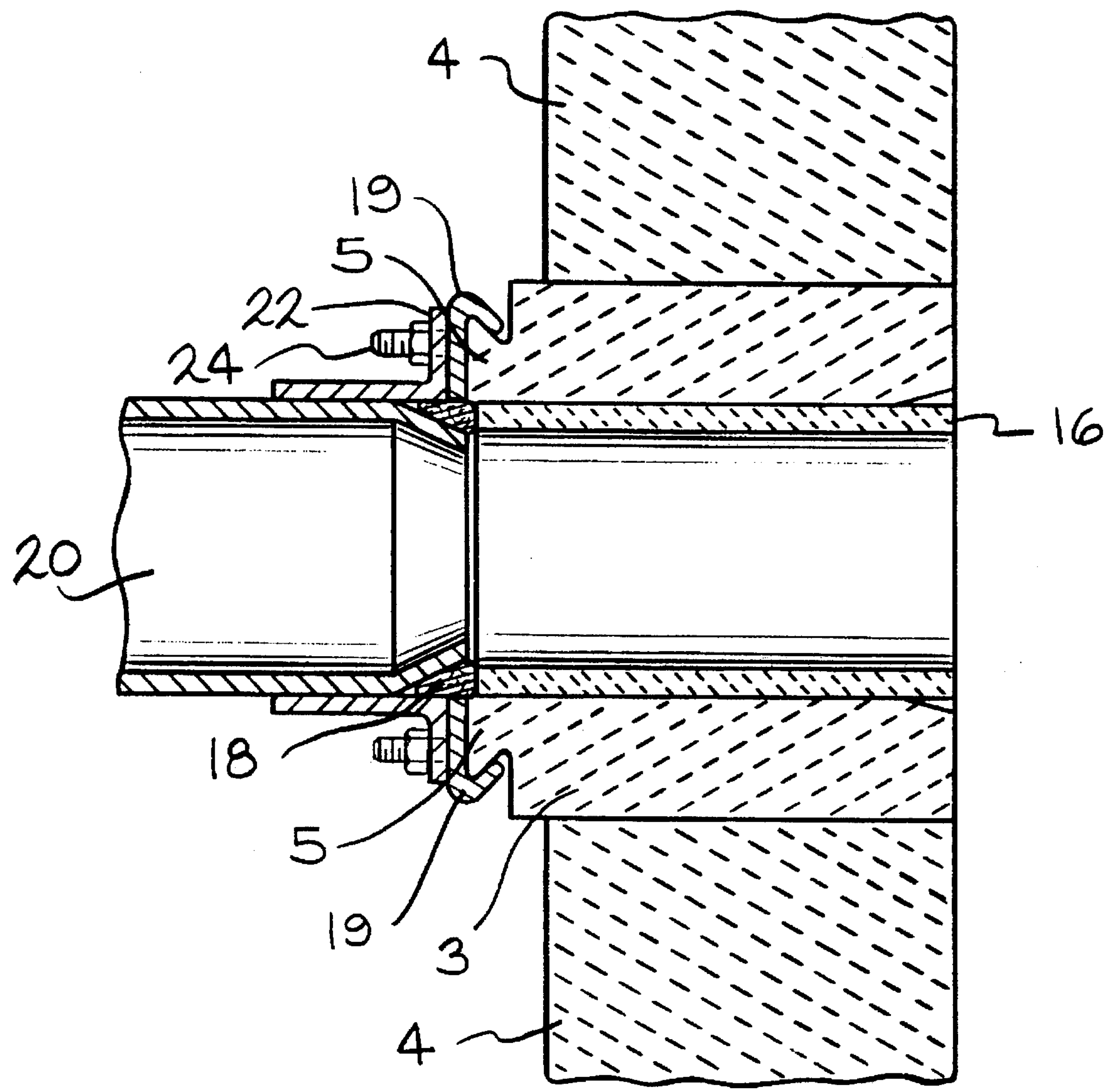
FIG. 4 is the partial cross section shown in FIG. 3 with the refractory tube used in the present invention in place and showing the end of an oxy-fuel burner mounted in a sealing and/or biased relationship with the end of said tube.

A refractory tube 16 (see FIG. 4) having an outer diameter slightly smaller than the hole 11 made by the core drill and a length slightly shorter than the length of the new tunnel 11 is prepared for insertion into the hole 11. Any good thermal shock resistant refractory compatible with the old burner block and the operating conditions can be used. For use in a glass melting tank or furnace ZED 3, manufactured by Zedmark Refractories Company of Dover, Ohio is preferred. The interior diameter of the refractory tube 16 is that required for the particular burner used. The length of the tube 16 is approximately the same as the length of the old burner block, but can be slightly shorter or longer. A refractory fiber or insulator plug is inserted into the outer end of the tube 16 to block the gases while it is being installed. A uniform layer about one sixteenth of an inch thick of refractory mortar, preferably 716 Zircon manufactured by Didier Taylor Company of Cincinnati, Ohio or other compatible refractory mortar is applied to the outer linear surface of the tube 16, the refractory plug in the tunnel of the old block is removed and the new tube 16 is pushed into the tunnel formed by the removal of the inner core 10 of the old block 2 until the trailing end of the tube is about one sixteenth to about one half inch or more from the outer exposed surface of the outer portion 3 of the old block 2, as shown in FIG. 4.

A ring or donut shaped gasket 18, having the dimensions of the cross section of the refractory tube 16 is cut from a refractory, mineral or glass fiber blanket to make a gasket. A suitable material is a one inch thick refractory fiber blanket, FIBERFRAX™, sold by the Carborundum Company of Niagara Falls, N.Y., having a density of about eight lbs./cubic foot. Other thicknesses and densities of material would be suitable so long as the fiber doesn't melt, adequate resistance is exerted by the material to compact it to a good seal, and so long as the burner doesn't bottom out on the tube 16 before a good seal is made. An easy way of making the gasket is to set the refractory tube 16 on end on the blanket and cut the blanket around the outside and the inside of the tube 16 using a sharp knife. This should be done at the very beginning before turning off the air-fuel burner. This gasket is now packed into the slight recess in the tunnel of the remaining portion 3 of the old block 2 and adjacent to the outside end of the installed refractory tube. Normally the compressible refractory or glass fiber gasket 18 will remain in place by the expansion force it exerts on the tunnel of block 3, but if necessary one face of the gasket can be dipped into the 716 Zircon mortar and adhered to the outside end of tube 16.

The new oxy-fuel burner is ready for installation. The new burner is installed by first sliding steel plate 19 containing studs 24 onto the ears 5 of the block 3 and sliding the oxy-fuel burner with its mount 22 onto the studs 24 and tightening it with nuts on the studs 24 such that the front portion of the burner engages and compresses gasket 18 to form a good seal. The burner is hooked up to oxygen and fuel and turned on. This procedure is repeated on each air-fuel burner to be converted to oxy-fuel until the conversion is complete.

Figure 5:
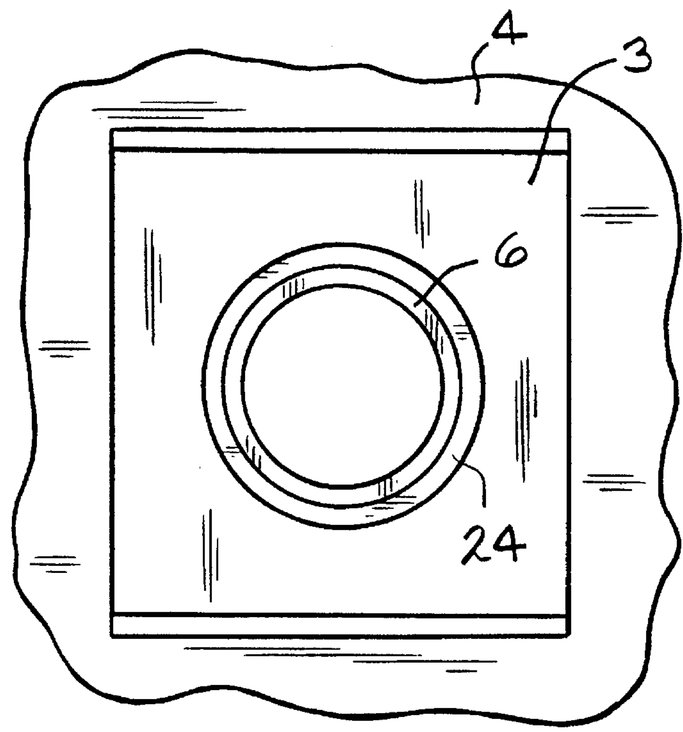
FIG. 5 is a vertical view of a portion of the interior of the sidewall of the melter showing the interior end of the refractory tube shown in FIG. 4.

FIG. 5 is a vertical view of the remaining outer portion 3 of the old burner block 2 with the new tube 16 mounted therein as seen from inside the furnace. The gap 24 is formed by the inner diameter of the original tunnel of the old burner block 2 and the outer diameter of the new refractory tube 16 in the preferred embodiment. The gap 24 extends only a short distance in to the wall, e.g. about 0.5 inch and its outer diameter decreases as it proceeds into the wall.

Using this process the wall of the furnace is undamaged and there is inconsequential impact on the process and production. About one hour is required to convert each burner to oxy-fuel using this procedure versus three to four hours with the old process of removing the old burner blocks. Also, unlike the old process, this new process avoids getting refractory into the glass when converting a glass melter avoiding process problems and glass scrap encountered in the past using the old procedure of conversion.

To reduce conversion time still further and to make conversion more convenient, the new refractory tube 16, the gasket 18 and the oxy-fuel burner 20, including plate 19, mount 22 and studs 24 or their equivalent, can all be preassembled into a single unit and then installed as a single unit after the center portion 10 of the old block is removed in the above described method of conversion.

Further modifications in this new procedure will be obvious to those skilled in the art and their use is considered part of the present invention.

I claim:

1. In the method of converting a furnace from air-fuel burners to oxy-fuel burners requiring a generally cylindrically shaped burner block tunnel comprising removing the old air-fuel burner, removing the old burner block, installing a new burner block, and installing an oxy-fuel burner, the improvement comprising removing only a center cylindrical portion of the old burner block, inserting a refractory tube into said center portion, said tube having an outer diameter just slightly smaller than the diameter of said cylindrical center portion and an inner diameter required by the oxy-fuel burner, and installing a compressible refractory gasket between the end of said tube and said oxy-fuel burner such that a seal is formed when said oxy-fuel burner is installed.

2. The method of claim 1 wherein said center cylindrical portion does not extend to the hottest end of the old burner block.

3. The method of claim 2 wherein said center portion is removed by core drilling and removing the cut out core.

4. The method of claim 2 wherein said compressible refractory gasket is made of refractory fiber.

5. The method of claim 4 wherein said gasket is shaped to match the cold end of said refractory tube and is compatible with said oxy-fuel burner.

6. The method of claim 5 wherein said gasket is cut or punched from a refractory fiber blanket about 1 inch thick, said blanket having a density of about eight pounds per cubic foot.

7. The method of any of claims 1–6 wherein only the burner being converted is turned off during the conversion while the remainder of the burners needed to maintain the process in control continue to operate.

8. The method of any of claims 1–6 wherein said refractory tube, said gasket, and said oxy-fuel burner are preassembled into a single unit and installed as a single unit.

9. An oxy-fuel burner assembly for installation in a furnace wall comprising an oxy-fuel burner, a refractory tube extending from said burner for mounting into said wall and for containing gases emitted by said burner as the gases pass through said wall into said furnace, a compressible fiber gasket located between one end of said tube and a protruding end of said oxy-fuel burner, said gasket being in a compressed and gas sealing condition.

* * * * *